Oct. 10, 1933.  M. LOUGHEAD  1,929,594
BRAKE MECHANISM
Original Filed Sept. 6, 1927
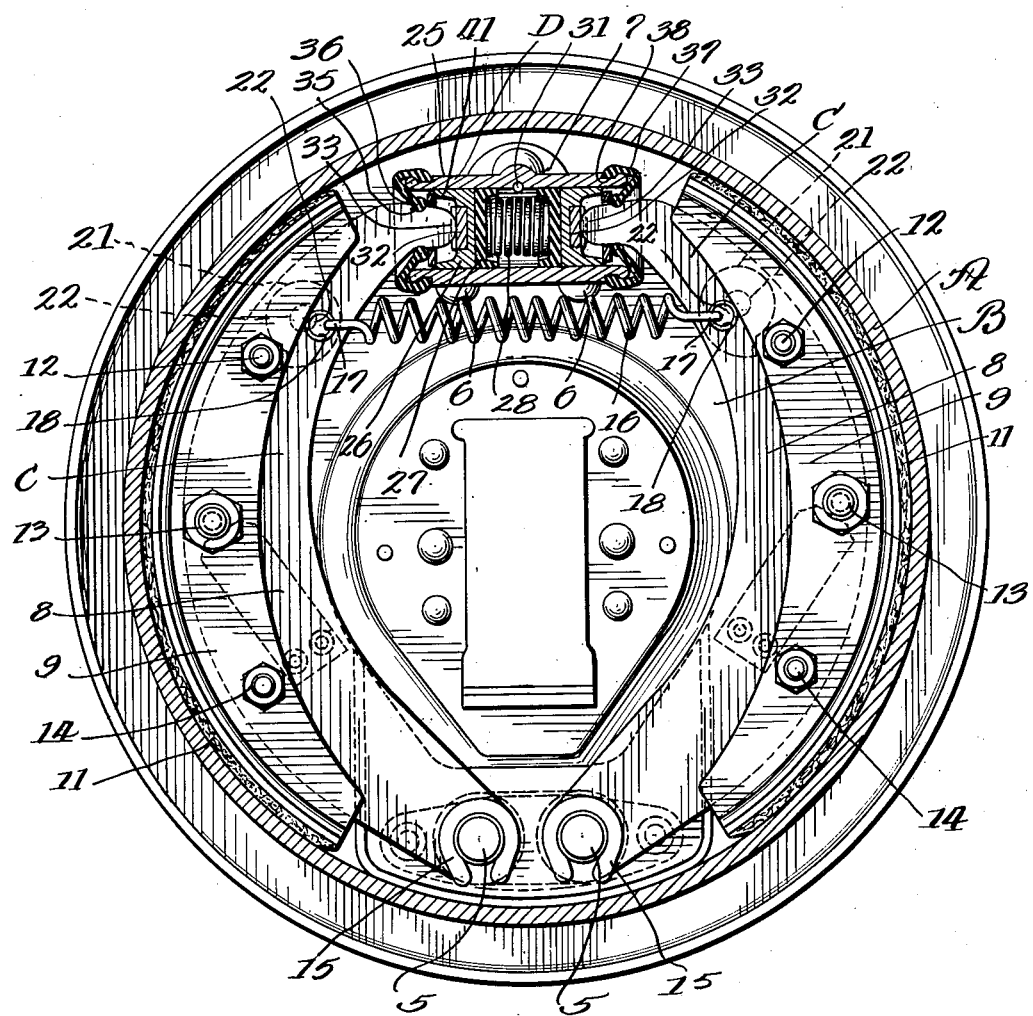
Inventor:
Malcolm Loughead
By Williams, Bradbury,
McCaleb & Hinkle.
Attys.

Patented Oct. 10, 1933

1,929,594

UNITED STATES PATENT OFFICE 1,929,594

BRAKE MECHANISM

Malcolm Loughead, Los Angeles, Calif., assignor to Hydraulic Brake Company, Los Angeles, Calif., a corporation of California Original application September 6, 1927, Serial No. 217,582. Divided and this application August 19, 1931. Serial No. 557,983

11 Claims. (Cl. 188—152)

This invention relates to brake mechanism. It will be described as embodied in a two-shoe hydraulic brake mechanism for motor vehicles.

This application is a division of my patent application Serial Number 217,582 filed September 6, 1927.

An object of this invention is the provision of an improved brake mechanism in which the brake shoes are simultaneously actuated by a single hydraulic mechanism operably interposed between the shoes.

A further object is the provision of such a brake mechanism combined and associated with means for retracting the brake shoes to maintain them constantly in engagement with the hydraulic mechanism so they may at all times be ready for actuation without lost motion except that resulting from necessary clearance between the shoes and the brake drum when the brakes are released.

Other objects and advantages of this invention will become apparent from the following description.

In the accompanying drawing,

The figure of the drawing is a side elevation of a vehicle brake mechanism embodying my invention and showing the brake drum and hydraulic actuating mechanism in section.

The vehicle brake illustrated in the drawing comprises a brake drum A, a stationary disc-like plate B substantially closing the open face of the brake drum, and on which is mounted a pair of brake shoes C, and hydraulic actuating mechanism D interposed between the free ends of the shoes.

The brake drum A is rotatable relative to the other parts of the brake mechanism, being normally fixed to a vehicle wheel to which the brake is applied, but it may be fixed to any rotating element of the vehicle directly or indirectly connected to the wheels. The stationary disc-like face plate or shield B has secured thereto anchor pins 5 which project therefrom for providing mounting means for the brake shoes C. The hydraulic actuating mechanism D is rigidly fixed to the plate B by a plurality of lugs 6 and 7 which may be welded to the plate if desired. The brake shoes C, as illustrated, are of multiple construction comprising actuating members 8 having an outer contour concentric with the drum, and segmental supporting members 9 complementary in contour and mounted on the members 8 to which they are secured by bolts 12, 13 and 14. The members 9 are provided with brake linings 11 for engagement with the drum A when the brakes are applied. Although I have illustrated multiple brake shoes, it is contemplated that any suitable type of brake shoes may be employed.

The brake shoes are held from dislodgment at their ends from the pivot pins 5 by lock plates 15, permitting them to oscillate on the pivot pins upon application and release of the brakes. When the brakes are released, the shoes are urged toward each other by the tension spring 16 having end portions 17 engaging the members 8 by hooking through openings 18 therein. For the purpose of limiting the retractile movement of the shoes I have provided adjustable stop members 21 fixed to the plate B by bolts 22, which stop members are adapted to be engaged by the bolts 12 upon release of the brake applying force. The hydraulic mechanism D for applying force to the brake shoes comprises an open-ended cylinder 25 having a uniform internal bore in which are fitted opposed metallic pistons 26 having skirts 41. Rubber cups 27 are fitted in the cylinder and seated on the faces of the pistons to form a fluid tight seal between the cylinder and the pistons. The cups 27 are held in position by an interposed compression spring 28, which spring is not as powerful as the spring 16 and may be overcome thereby when the fluid pressure is released from the cylinder. For actuating the brakes, fluid under pressure is admitted to the cylinder through the port 31. The fluid forces both pistons outwardly with equal force which in turn, through the medium of hard metal wear plates 32, transmit force to the terminals 33 of the brake shoes C and force them to oscillate about the pivot pins 5 and into engagement with the drum. The wear plates 32 are interposed between the terminal portions 33 of the brake shoes and the pistons and are preferably disposed in the outer faces of the pistons as illustrated in the drawing.

For preventing the admission of dirt and dust to the open ends of the cylinder I have provided on the terminals 33, annular recesses 35 into which are fitted the beads 36 of the flexible boots 37, the outer edges of which embrace the ends of the cylinder 25 and seat within the annular recesses 38.

While I have herein described the preferred form of my invention, it is understood to be susceptible of modification and I desire to avail myself of such modifications as come within the scope of the appended claims.

I claim as my invention:

1. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, sealing cups on the faces of said pistons, and yieldable means interposed between said cups for maintaining the cups in position.

2. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, sealing cups on the opposed faces of said pistons and a compression spring for holding the cups in position.

3. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, sealing cups on the opposed faces of said pistons, a compression spring for holding the cups in position, and a second spring urging said shoe means against said pistons.

4. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, sealing cups on the faces of said pistons, yieldable means interposed between said cups for maintaining the cups in position, and a second yieldable means engaging and urging said shoe means against the outer sides of said pistons.

5. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, sealing cups on the opposed faces of said pistons, a compression spring for holding the cups in position, and a tension spring including hook portions engaging said shoe means and urging the same against said pistons with sufficient force to overcome the force of said compression spring.

6. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, wear plates formed in said pistons at the points of engagement by said brake shoe means, sealing cups on the faces of said pistons and yieldable means interposed between said cups for maintaining the cups in position.

7. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, wear plates formed in said pistons at the points of engagement by said brake shoe means, sealing cups on the faces of said pistons and a compression spring for holding the cups in position.

8. In a brake mechanism in combination, brake shoe means, a brake cylinder having a port for the admission of fluid under pressure, opposed pistons in said cylinder adapted for movement in opposite directions by fluid pressure therein, said brake shoe means operably engaging said pistons for actuation thereby, wear plates formed in said pistons at the points of engagement by said brake shoe means, sealing cups on the faces of said pistons, a compression spring for holding the cups in position, and a tension spring including hook portions engaging said shoe means for urging the same against said pistons with sufficient force to overcome the force of said compression spring.

9. In a brake mechanism in combination, a mounting plate, brake shoe means pivotally secured to said mounting plate, a brake cylinder rigidly fixed on said mounting plate and having a centrally disposed port for the admission and discharge of fluid under pressure, opposed pistons spaced apart in said cylinder providing space for fluid therebetween, said brake shoe means including terminal portions engaging the outer ends of said pistons for actuation thereby, sealing cups seated on the faces of said pistons, a compression spring interposed between said cups, a tension spring of greater strength than said compression spring engaging said shoe means for retracting the same from braking position and forcing said pistons toward the center of said cylinder upon the discharge of fluid pressure therefrom.

10. In a brake mechanism in combination, a mounting plate, brake shoe means pivotally secured to said mounting plate, a brake cylinder rigidly fixed on said mounting plate and having a centrally disposed port for the admission and discharge of fluid under pressure, opposed pistons spaced apart in said cylinder providing space for fluid therebetween, said brake shoe means including terminal portions engaging the outer ends of said pistons for actuation thereby, sealing cups seated on the faces of said pistons, a compression spring interposed between said cups, a tension spring of greater strength than said compression spring engaging said shoe means for retracting the same from braking position and forcing said pistons toward the center of said cylinder upon the discharge of fluid pressure therefrom, and means on said mounting plate for limiting the retractile movement of said brake shoe means.

11. In a brake mechanism, in combination, a brake drum, a mounting plate adjacent said drum, anchor means carried by said mounting plate, oppositely disposed brake shoes adapted for forced engagement with said brake drum, wear linings on said brake shoes, a brake applying cylinder open at both ends, said cylinder mounted on said plate, pistons fitted in each end of said cylinder and adapted for outward movement by fluid pressure within said cylinder, said pistons being connected with the free ends of said shoes to move the wear linings on said shoes into engagement with said drum, sealing cups separably associated with the faces of said pistons, stops for said brake shoes adjustable to compensate for wear of said linings, a compression spring confined between said cups and holding them against said pistons for all positions of said stops, and retractile spring means normally holding said shoes against said stops.

MALCOLM LOUGHEAD.